(12) United States Patent  (10) Patent No.: US 11,904,854 B2
McGill et al.                (45) Date of Patent:     Feb. 20, 2024

(54) SYSTEMS AND METHODS FOR MODELING PEDESTRIAN ACTIVITY

(71) Applicant: Toyota Research Institute, Inc., Los Altos, CA (US)

(72) Inventors: Stephen G. McGill, Broomall, PA (US); Guy Rosman, Newton, MA (US); Paul Drews, Watertown, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 309 days.

(21) Appl. No.: 16/834,436

(22) Filed: Mar. 30, 2020

(65) Prior Publication Data

US 2021/0300359 A1    Sep. 30, 2021

(51) Int. Cl.
G06N 3/08      (2023.01)
G06V 20/56     (2022.01)
G06V 10/764    (2022.01)
G06V 10/774    (2022.01)
B60W 30/095    (2012.01)
B60W 60/00     (2020.01)
(Continued)

(52) U.S. Cl.
CPC .... B60W 30/0956 (2013.01); B60W 60/0017 (2020.02); G06N 3/08 (2013.01); G06T 7/74 (2017.01); G06V 10/764 (2022.01); G06V 10/774 (2022.01); G06V 20/56 (2022.01); G06V 20/588 (2022.01); G06V 40/103 (2022.01); B60W 2552/45 (2020.02); B60W 2554/406 (2020.02); B60W 2554/4029 (2020.02); B60W 2554/4041 (2020.02); B60W 2554/4043 (2020.02); G06T 2207/30256 (2013.01)

(58) Field of Classification Search
CPC ......... B60W 30/0956; B60W 60/0017; B60W 2554/4041; B60W 2554/4029; B60W 2554/406; B60W 2554/4043; B60W 2552/45; G06T 7/74; G06T 2207/30256; G06V 20/588; G06N 3/08
USPC ....................................................... 701/301
See application file for complete search history.

(56) References Cited

U.S. PATENT DOCUMENTS 10,403,138 B2    9/2019  Wu
10,496,091 B1   12/2019  Ross et al.
(Continued)

FOREIGN PATENT DOCUMENTS

CN      106428000 B      12/2018
DE     212018000230   *  2/2020
(Continued)

OTHER PUBLICATIONS

Crosswalk Evaluation Flowchart and Background, May 31, 2018, City of Saint Paul (Year: 2018).*
(Continued)

*Primary Examiner* — Elaine Gort
*Assistant Examiner* — Matthias S Weisfeld
(74) *Attorney, Agent, or Firm* — DINSMORE & SHOHL LLP

(57) ABSTRACT

A method includes receiving data relating to pedestrian activity at one or more locations outside of a crosswalk, analyzing the data, based on the data, identifying at least one location of the one or more locations as a constructive crosswalk, and controlling operation of an autonomous vehicle based on the at least one location of the constructive crosswalk.

10 Claims, 8 Drawing Sheets

(51) Int. Cl.
*G06T 7/73* (2017.01)
*G06V 40/10* (2022.01)

(56) References Cited

U.S. PATENT DOCUMENTS

| | | | |
|---|---|---|---|
| 2019/0025820 A1* | 1/2019 | Ferguson | G08G 1/0112 |
| 2019/0221116 A1 | 7/2019 | Powch et al. | |
| 2020/0207375 A1* | 7/2020 | Mehta | G06V 20/56 |
| 2020/0273345 A1* | 8/2020 | Mangal | G06Q 10/06 |
| 2020/0406895 A1* | 12/2020 | Kumano | B60W 30/143 |
| 2021/0053561 A1* | 2/2021 | Beller | G08G 1/166 |
| 2021/0097148 A1* | 4/2021 | Bagschik | G06F 30/15 |
| 2021/0294323 A1* | 9/2021 | Bentahar | G06N 20/00 |

FOREIGN PATENT DOCUMENTS

| | | | |
|---|---|---|---|
| KR | 100907548 B1 | 7/2009 | |
| KR | 101454127 B1 | 10/2014 | |
| WO | 2017033443 A1 | 3/2017 | |

OTHER PUBLICATIONS

Jaeseo Park, Convolutional Neural Network-based Jaywalking Data Generation and Classification, Oct. 9, 2019, 2019 International SoC Design Conference (Year: 2019).*

Nan Li, Xiaochun Jian, Shenghong Liu, "Study on Pedestrian Crossing Speed Characteristics in Unsignalized Crosswalks of Mountainous City", 2011 International Conference on Remote Sensing, Environment and Transportation Engineering, Jun. 24-26, 2011, 2 pages, https://ieeexplore.ieee.org/document/5965243.

Alexandros Rouchitsas, Hakan Alm, "External Human-Machine Interfaces for Autonomous Vehicle-to-Pedestrian Communication: a Review of Empirical Work", Dec. 10, 2019, 19 pages, https://www.frontiersin.org/ articles/10.3389/fpsyg.2019.02757/full.

* cited by examiner

SYSTEMS AND METHODS FOR MODELING PEDESTRIAN ACTIVITY

TECHNICAL FIELD

The present specification relates to modeling of road behavior, and more particularly, to systems and methods for modeling pedestrian activity.

BACKGROUND

Autonomous vehicles must navigate a variety of driving environments. In particular, autonomous vehicles must be aware of pedestrians crossing streets. Autonomous vehicles may access maps, which may indicate locations of crosswalks, to assist in autonomous driving. Thus, autonomous vehicles may adjust their driving behavior when approaching crosswalks to avoid pedestrians, for example, by driving more slowly or cautiously. However, pedestrians often cross streets at locations that do not have crosswalks. These situations can be more difficult for autonomous vehicles to navigate while avoiding pedestrians.

SUMMARY

In one embodiment, a method may include receiving data relating to pedestrian activity at one or more locations outside of a crosswalk, analyzing the data, based on the data, identifying at least one location of the one or more locations as a constructive crosswalk, and controlling operation of an autonomous vehicle based on the at least one location of the constructive crosswalk.

In another embodiment, a method may include capturing an image of a road portion, inputting the image of the road portion into a trained neural network, and based at least in part on an output of the neural network, determining a likelihood that one or more locations of the road portion comprise a constructive crosswalk where pedestrians are likely to cross a street outside of a crosswalk.

In another embodiment, a computing device may comprise one or more processors, one or more memory modules, and machine readable instructions stored in the one or more memory modules that, when executed by the one or more processors, cause the server to receive data relating to pedestrian activity at one or more locations outside of a crosswalk, analyze the data, based on the data, identify at least one location of the one or more locations as a constructive crosswalk, and control operation of an autonomous vehicle based on the at least one location of the constructive crosswalk.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for modeling pedestrian activity or behavior and identifying locations where pedestrians are likely to cross a street. Autonomous vehicles typically navigate and perform self-driving by gathering sensor data to detect their surrounding environment and by utilizing digital maps. Digital maps may provide information about a driving environment including locations of a variety of road features.

One road feature that may be identified on a map is a crosswalk. A crosswalk is a designated area provided for pedestrians to cross a street. If crosswalk locations are stored on a digital map that may be accessed by an autonomous vehicle, the autonomous vehicle may be aware of when it is approaching a crosswalk. As such, when an autonomous vehicle approaches a crosswalk, the autonomous vehicle may take extra driving precautions to avoid collisions with any pedestrians that may be using the crosswalk to cross a street.

However, pedestrians do not always cross streets at crosswalks. For a variety of reasons, pedestrians may cross a street at a location outside of a crosswalk. For example, some streets may not have a crosswalk, some streets may have crosswalks that are degraded or not clearly visible, or it may be more convenient for a pedestrian to cross a street outside of a crosswalk. When a pedestrian crosses a street at a location outside of a crosswalk, an autonomous vehicle approaching the location may utilize different driving algorithms or functionality than when the autonomous vehicle approaches a crosswalk since pedestrians are not expected to cross at the location outside of a crosswalk. Accordingly, there may be a higher chance of a collision between an autonomous vehicle and a pedestrian crossing a street outside of a crosswalk.

While pedestrians may potentially cross a street at any location outside of a crosswalk, there may be certain locations where pedestrians are more likely to cross a street outside of a crosswalk. These may be locations near parks, schools, hospitals, or other types of establishments. Alternatively, they may be locations where crosswalks are not present. There may be any number of other factors that cause pedestrians to cross a street at certain locations outside of a crosswalk. By identifying such locations where pedestrians are likely to cross a street outside of a crosswalk, these locations may be included in a digital map that may be accessed by an autonomous vehicle. Then, when an autonomous vehicle approaches one of these locations, the autonomous vehicle may be aware that pedestrians are likely to cross the street and the vehicle may use the same driving algorithms or functionality that would be used at an actual crosswalk, thereby decreasing the chance of collisions with pedestrians. Accordingly, disclosed herein are methods and systems for identifying locations outside of crosswalks where pedestrians are likely to cross a street.

Figure 1:
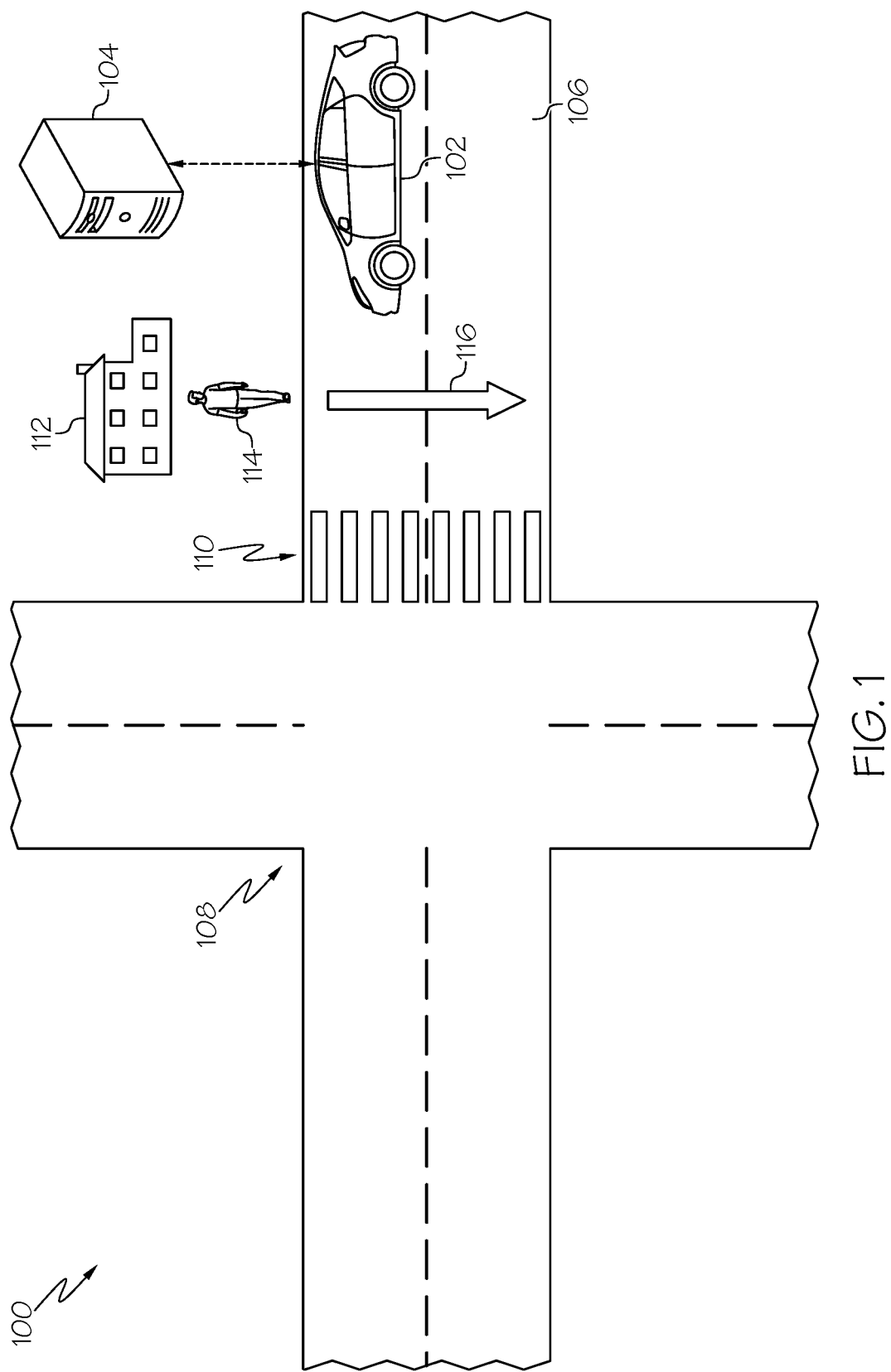
FIG. 1 schematically depicts an example system for modeling pedestrian activity in an example environment, according to one or more embodiments shown and described herein.

FIG. 1 schematically depicts a system 100 for modeling pedestrian activity and identifying locations outside of crosswalks where pedestrians are likely to cross the street. The system 100 includes a vehicle 102 and a remote computing device 104. In the illustrated example, the vehicle 102 is an autonomous vehicle driven by computer control. In other examples, the vehicle 102 may be a non-autonomous vehicle driven by a human driver. In the example of FIG. 1, the vehicle 102 drives along a road 106 approaching an intersection 108. A crosswalk 110 is located near the intersection 108. A school 112 is located along the side of the road 106 and a student 114 has exited the school 112. The student 114 intends to cross the street 106 along path 116, which is outside of the crosswalk 110. If students or other pedestrians often cross the street 106 along or near path 116, this location may be considered a constructive crosswalk. As used herein, a "constructive crosswalk" refers to a location outside of a crosswalk where pedestrians are likely to cross a street. In one example, a constructive crosswalk is a location outside of a crosswalk where the probability of one or more pedestrians crossing a street at the location of the constructive crosswalk is greater by at least a threshold amount than the probability of one or more pedestrians crossing a street at nearby locations (e.g., locations adjacent to the constructive crosswalk location). By identifying locations of constructive crosswalks, the autonomous vehicle 102 may be able to operate to accommodate potential and existing pedestrians at such locations and minimize the chance of collisions with pedestrians.

The remote computing device 104 is communicatively coupled to the vehicle 102. In some examples, the remote computing device 104 may be a fixed edge server, e.g., a road-side unit (RSU), and any type of computing device capable of performing the functionalities described herein. In these examples, a variety of similar edge servers may be positioned at various locations along the road 106 or along other roads. In some examples, the remote computing device 104 may be a moving edge server, e.g., another vehicle on the road 106. In some examples, the remote computing device 104 may be positioned near the road 106 such that it may be communicatively coupled to the vehicle 102. In other examples, the remote computing device 104 may be a cloud server or remote computing device.

Figure 2:
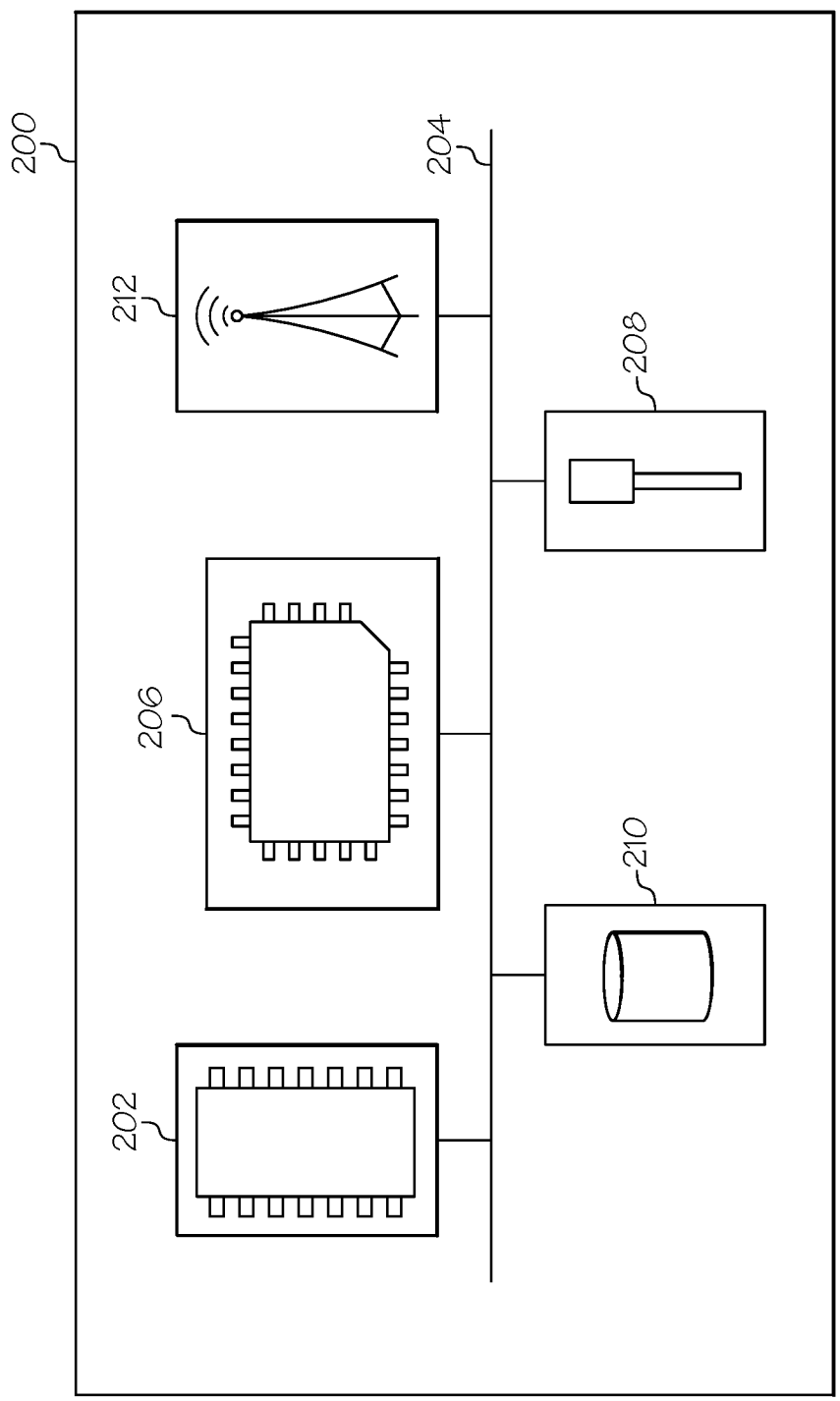
FIG. 2 depicts a schematic diagram of an example vehicle system for modeling pedestrian activity among other functionalities, according to one or more embodiments shown and described herein.

FIG. 2 depicts an example vehicle system 200 included in the vehicle 102 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the vehicle 102. These modules are not shown in FIG. 2 for brevity. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location. The vehicle 102 may transmit its location to the remote computing device 104, as explained in further detail below.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. The vehicle sensors 210 may be used to navigate the autonomous vehicle 102. In addition, the vehicle sensors 210 may detect the presence of pedestrians. In particular, the vehicle sensors 210 may detect pedestrians crossing a street.

By detecting pedestrians crossing a street, the vehicle sensors 210 may assist in identifying locations of constructive crosswalks, as explained in further detail below. In addition to detecting one or more pedestrians crossing a street, the vehicle sensors 210 may also detect a velocity of one or more pedestrians, a direction of travel of one or more pedestrians, a density of pedestrians (e.g., the number of pedestrians in a group of pedestrians), and other features related to the activity of pedestrians. In some examples, the vehicle sensors 210 may capture an image of a scene, such as the scene shown in FIG. 1.

Still referring to FIG. 2, the vehicle system 200 comprises network interface hardware 212 for communicatively coupling the vehicle system 200 to the remote computing device 104. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. The network interface hardware 212 of the vehicle system 200 may transmit information about pedestrians detected by the vehicle sensors 210 to the remote computing device 104. In some examples, the network interface hardware 212 may transmit one or more images captured by the vehicle sensors 210 to the remote computing device 104. In some examples, the network interface hardware 212 may receive a map of a particular location from the remote computing device 104 that the autonomous vehicle 102 may use to navigate.

In some embodiments, the vehicle system 200 may be communicatively coupled to the remote computing device 104 (See FIG. 1) by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
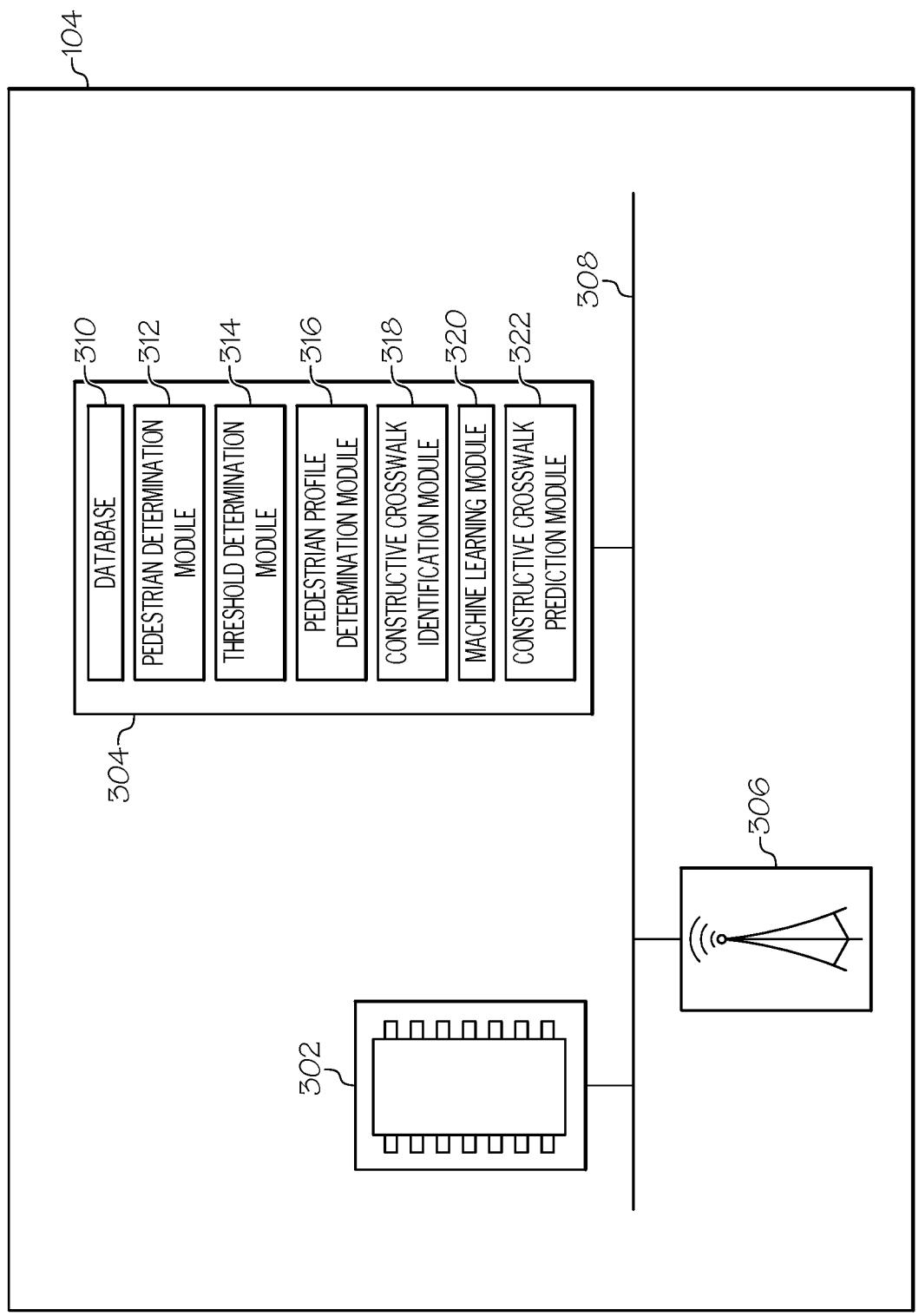
FIG. 3 depicts a schematic diagram of an example computing device for modeling pedestrian activity, according to one or more embodiments shown and described herein.

Now referring to FIG. 3, the remote computing device 104 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the remote computing device 104.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the remote computing device 104 may transmit and receive data to and from the vehicle 102.

The one or more memory modules 304 include a database 310, a pedestrian determination module 312, a threshold determination module 314, a pedestrian profile determination module 316, a constructive crosswalk identification module 318, a machine learning module 320, and a constructive crosswalk prediction module 322. Each of the database 310, the pedestrian determination module 312, the threshold determination module 314, the pedestrian profile determination module 316, the constructive crosswalk identification module 318, the machine learning module 320, and the constructive crosswalk prediction module 322 may be a program module in the form of operating systems, application program modules, and other program modules stored in one or more memory modules 304. In some embodiments, the program module may be stored in a remote storage device that may communicate with the remote computing device 104. In some embodiments, one or more of the database 310, the pedestrian determination module 312, the threshold determination module 314, the pedestrian profile determination module 316, the constructive crosswalk identification module 318, the machine learning module 320, and the constructive crosswalk prediction module 322 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily store data received from the vehicle 102. The data received from the vehicle 102 may include information about pedestrian activity detected by the vehicle sensors 210 and/or images captured by the vehicle sensors 210. In some examples, the remote computing device 104 may receive information about pedestrian activity and/or images captured by other devices, such as traffic cameras. This information may also be stored in the database 310.

In some examples, the database 310 may permanently store certain data such as map data. In particular, the database 310 may store map data that includes locations of constructive crosswalks, identified using the techniques described herein. The map data stored in the database 310 may be updated by the constructive crosswalk identification module 318, as described in further detail below. In addition, in some examples, the database 310 may store machine learning parameters used by and/or determined by the machine learning module 320, as discussed in further detail below. In some examples, the map data and/or the machine learning parameters may be stored on a different server or computing device than the remote computing device 104. In some examples, the map data and/or the machine learning parameters may be stored on the vehicle system 200.

Referring still to FIG. 3, the pedestrian determination module 312 may determine the presence of pedestrians. Specifically, the pedestrian determination module 312 may determine the presence of pedestrians based on data received from the vehicle sensors 210. The pedestrian determination module 312 may use a variety of techniques to determine the presence of pedestrians. In one example, the pedestrian determination module 312 may analyze a captured image of a road portion and may utilize image analysis and/or object detection algorithms to determine whether one or more pedestrians are present in the image. For example, the pedestrian determination module 312 may utilize a trained convolutional neural network to determine the presence of pedestrians in an image. In other examples, the pedestrian determination module 312 may utilize other types of data from the vehicle sensors 210 such as data from LiDAR sensors or proximity sensors to determine the presence of pedestrians.

In addition to determining the presence of pedestrians, the pedestrian determination module 312 may determine whether pedestrians are crossing a street outside of a crosswalk. For example, when performing image analysis, the pedestrian determination module 312 may use an object detection algorithm to identify one or more roads and one or more crosswalks in an image. The pedestrian determination module 312 may further identify pedestrians in an image and may determine if those pedestrians are within a crosswalk or if those pedestrians are located on a street outside of a crosswalk. The pedestrian determination module 312 may also use map data and/or GPS data instead of, or in addition to, image data to determine if pedestrians and located on a street outside of a crosswalk. If the pedestrian determination module 312 identifies pedestrians on a street outside of a crosswalk, the location of the pedestrians may be part of a constructive crosswalk.

In addition to determining whether any pedestrians are on a street outside of a crosswalk at one instant in time (e.g., based on analysis of one image), the pedestrian determination module 312 may also track pedestrian activity over time at one or more locations. For example, the vehicle 102 may transmit sensor data to the remote computing device 104 as it drives along the road 106 and other vehicles driving along the road 106 may also transmit sensor data to the remote computing device 104. In some examples, additional data may be transmitted to the remote computing device 104 from traffic cameras or other devices in the vicinity of the road 106. As such, the pedestrian determination module 312 may determine a time sequence of data regarding pedestrian activity along the road 106. That is, the pedestrian determination module 312 may determine a number of pedestrians crossing the street 106 outside of the crosswalk 110 at specific times.

In some examples, the pedestrian determination module 312 may also identify wheelchairs, bicycles, scooters, segues, or similar devices that cross a street outside of a crosswalk. This may allow the server to identify constructive crosswalk locations where people using these devices are likely to cross the street outside of a crosswalk. In other examples, the remote computing device 104 may contain a separate module for performing this task.

The threshold determination module 314 may determine whether the number of pedestrians crossing a street at a particular location reaches a threshold, as explained herein. This metric may be used to determine whether a particular location is considered a constructive crosswalk.

While the pedestrian determination module 312 may determine instances in which one or more pedestrians cross a street at a particular location outside of a crosswalk, not all such instances mean that the location should be considered a constructive crosswalk. If a single pedestrian crosses a street at the location and no other pedestrians are observed crossing the street at that location, it is unlikely that the location is a constructive crosswalk where pedestrians often cross the street. As such, in some examples, a frequency with which pedestrians cross a street at a particular location outside of a crosswalk is considered in identifying locations of constructive crosswalks.

In one example, the threshold determination module 314 determines whether the number of pedestrians crossing a street at a particular location outside of a crosswalk within a predetermined time period is greater than a predetermined threshold. For example, the threshold determination module 314 may determine whether more than five pedestrians cross the street at a particular location outside of a crosswalk within a five minute period. This may be an indication that the location is a constructive crosswalk. In other examples, other predetermined time periods may be used (e.g., on the order of seconds, minutes, hours, days, etc.). A corresponding threshold may be used depending on the time period being used. For example, a longer time period may be used along with a higher threshold number of pedestrians.

In some examples, for a particular location, predetermined threshold, and predetermined time period, the threshold determination module 314 may consider all such time periods for which data is available and determine whether the number of pedestrians crossing the street during any such time period exceeds the threshold. For example, the threshold determination module 314 may determine whether more than five pedestrians cross the street during any five minute period for which data is available. In other examples, the threshold determination module 314 may only consider time periods within certain windows (e.g., certain days of the week or certain times of day).

In some examples, the threshold determination module 314 may use multiple predetermined thresholds and corresponding predetermined time periods and determine whether the number of pedestrians crossing the street during any of the predetermined periods exceeds the corresponding threshold. For example, the threshold determination module 314 may determine whether, for a particular location, more than five pedestrians crossed the street during any five minute period or whether more than twenty pedestrians crossed the street during any one hour period. In some examples, the threshold determination module 314 may determine whether multiple instances have occurred where the number of pedestrians crossing the street during a predetermined time period at a location is greater than a predetermined threshold (e.g., whether more than five pedestrians crossed the street at the location within three of more different five minute time periods). Requiring multiple such occurrences may set a higher bar before a location is determined to be a constructive crosswalk. The predetermined threshold and time period may be set higher or lower depending on how high of a bar is to be set when identifying constructive crosswalks.

The pedestrian profile determination module 316 may determine a pedestrian profile for a particular constructive crosswalk location. A pedestrian profile may indicate a variety of factors relating to the manner in which pedestrians typically cross the street at a constructive crosswalk. For example, at some locations, pedestrians may tend to cross the street in large groups, whereas at other locations, pedestrians may tend to cross the street individually or in small groups. At some locations, pedestrians may tend to cross the street more quickly than at other locations. At some locations, pedestrians may tend to assert the right of way and cross the street regardless of traffic and at other locations, pedestrians may tend to be more cautious and only cross the street when there is little or no traffic present. At some locations, pedestrians may tend to cross straight across the street while at other locations pedestrians may tend to cross the street in a diagonal or other path. The pedestrian profile may include a most probable path that pedestrians cross the street at the constructive crosswalk.

Any such factors relating to the manner in which pedestrians cross the street may be considered as part of a pedestrian profile for a particular location. Having access to a pedestrian profile for a particular location may allow an autonomous vehicle to modify its driving behavior based on the pedestrian profile to further decrease the chance of collisions with pedestrians.

The pedestrian profile determination module 316 may analyze vehicle sensor data and other pedestrian activity data to determine a pedestrian profile for a particular location of a constructive crosswalk. For example, the pedestrian profile determination module 316 may analyze all instances in which pedestrians crossed a street at a particular location outside of a crosswalk and may determine features such as average pedestrian density, average pedestrian velocity, typical direction of travel of pedestrians crossing the street, likelihood of pedestrians to cede the right of way, and the like. The pedestrian profile determination module 316 may determine a pedestrian profile for a particular location based on an analysis of this data.

In some examples, the pedestrian profile determination module 316 may determine that pedestrians are only likely to cross a street outside of a crosswalk at a particular location at certain times of the day or certain days of the week. The pedestrian profile determination module 316 may include this information in a pedestrian profile as well. In some examples, a pedestrian profile may indicate a likelihood of pedestrians crossing the street at a particular location outside of a crosswalk at one or more times of day or days of the week. For example, a pedestrian profile may indicate that pedestrians often cross the street at a particular location during weekday mornings and early evenings but rarely cross the street at the location at other times.

The constructive crosswalk identification module 318 may identify locations of constructive crosswalks based on the information determined by the pedestrian determination module 312, the threshold determination module 314, and/or the pedestrian profile determination module 316. In one example, the constructive crosswalk identification module 318 identifies a location as a constructive crosswalk if the threshold determination module 314 determines that the number of pedestrian crossing the street at the location during a predetermined time period exceeds a predetermined threshold. In other examples, other information determined by the pedestrian determination module 312, the threshold determination module 314, and/or the pedestrian profile determination module 316 may be used by the constructive crosswalk identification module 318 to identify a location as a constructive crosswalk.

Figure 9:
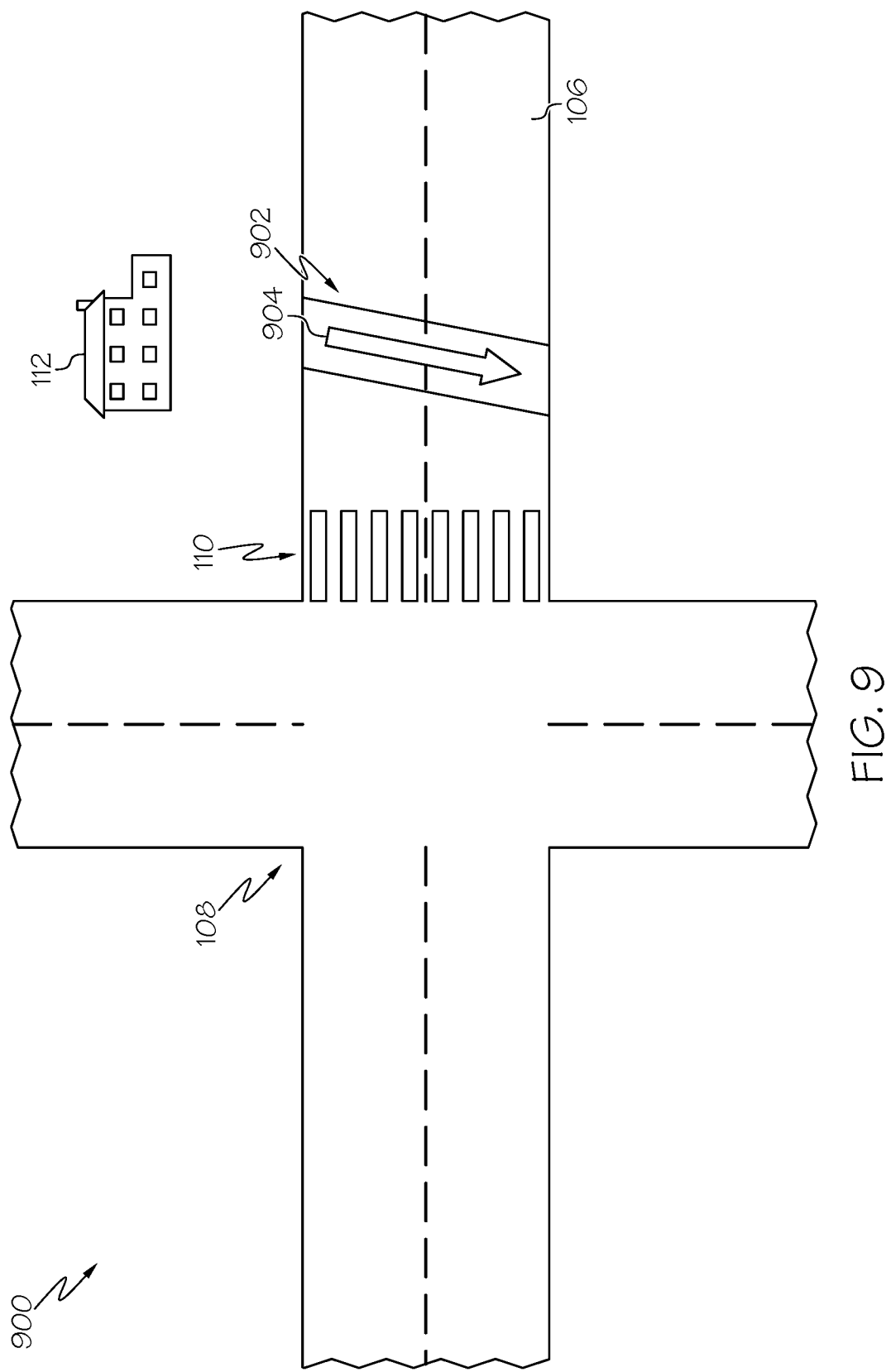
FIG. 9 depicts an example map containing a constructive crosswalk.

In some examples, the constructive crosswalk identification module 318 may identify a location as a constructive crosswalk only during certain hours of the day or on certain days of the week. In some examples, the constructive crosswalk identification module 318 may associate a pedestrian profile determined by the pedestrian profile determination module 316 with a constructive crosswalk location. In some examples, the constructive crosswalk identification module 318 may store the location of an identified constructive crosswalk location and an associated pedestrian profile in the database 310. In some examples, the constructive crosswalk identification module 318 may update a map to add a location of a constructive crosswalk and an associated pedestrian profile. For example, FIG. 9 shows a map 900 of the scene of FIG. 1, in which a constructive crosswalk 902 has been added to the map. An arrow 904 indicates a typical direction of travel for pedestrians crossing the street 106 in the constructive crosswalk 902.

In some embodiments, the one or more memory modules include the machine learning module 320 and the constructive crosswalk prediction module 322. These modules may be used to predict whether a previously unseen road portion is likely to contain a constructive crosswalk, using techniques described herein. In some embodiments, the machine learning module 320 and the constructive crosswalk prediction module 322 may be omitted from the one or more memory modules 304.

The machine learning module 320 may analyze images of locations that the constructive crosswalk identification module 318 has identified as constructive crosswalks and use machine learning techniques to learn one or more features of the images to predict whether images of road portions are likely to contain constructive crosswalks. The machine learning module 320 may use machine learning techniques to learn such predictive features.

In one example, a first plurality of images of road portions that the constructive crosswalk identification module 318 has identified as containing a constructive crosswalk are labeled as containing a constructive crosswalk, and a second plurality of images of road portions that the constructive crosswalk identification module 318 has not identified as containing a constructive crosswalk are labeled as not containing a constructive crosswalk. In some examples, humans may label one or more images of road portions as either containing or not containing a constructive crosswalk based on observation of the images and/or data associated with the road portions in the images.

After a plurality of images are labeled, the labeled images may be used as training data or training examples for a neural network (e.g., a convolutional neural network). The neural network makes a prediction as to the likelihood that an image of a road portion contains a constructive crosswalk. As such, the neural network may be trained to minimize a cost function, such as an average difference between the predicted likelihoods and the ground truth (e.g., the labels for the training examples as to whether each image contains a constructive crosswalk). After the neural network is trained, the learned parameters may be stored in the database 310. In some examples, an algorithm for predicting whether a road portion in an image contains a constructive crosswalk may be created by humans rather than using a neural network and machine learning techniques.

After the machine learning module 320 trains a neural network to predict the likelihood that an image of a road portion contains a constructive crosswalk, the constructive crosswalk prediction module 322 may predict the likelihood that an image of a previously unseen road portion contains a constructive crosswalk. Specifically, the vehicle 102 (or another entity capable of capturing images) may capture an image of a road portion. The image may be transmitted to the remote computing device 104 and the constructive crosswalk prediction module 322 may input the image into the neural network trained by the machine learning module 320. Using the learned parameters, the neural network may predict the likelihood that the road portion captured in the image contains a constructive crosswalk. This information may then be transmitted to the vehicle 102.

As such, in one example, as the vehicle 102 drives along different roads, the vehicle sensors 210 may capture images of the roads. These images may be uploaded to the remote computing device 104 along with the location of the vehicle 102. As the remote computing device 104 receives the road images and location data, the remote computing device 104 may determine whether a map exists in the database 310 for the vehicle's location. If the database 310 contains a map of the location, the server may transmit the map to the vehicle 102. The vehicle 102 may then use the map to determine if there are any upcoming constructive crosswalks and adjust the vehicle's driving behavior accordingly.

Alternatively, if the database 310 does not contain a map of the vehicle's location, then the constructive crosswalk prediction module 322 may use the received image and the neural network trained by the machine learning module 320 to determine the likelihood that the vehicle 102 is approaching a constructive crosswalk. The remote computing device 104 may then transmit this information to the vehicle 102 and if there is a high likelihood that the vehicle 102 is approaching a constructive crosswalk, the vehicle's driving behavior may be adjusted accordingly.

In some examples, the constructive crosswalk prediction module 322 may use received images to predict the likelihood that a road portion in a particular location contains a constructive crosswalk even when the database 310 contains a map of the location. Both the map of the location and the predicted likelihood of the road portion may be transmitted to the vehicle 102. The vehicle 102 may use either or both sets of data to adjust its driving behavior.

In some examples, a neural network may be trained to identify different types of constructive crosswalks (e.g., for pedestrians, bicycles, wheelchairs, etc.). In these examples, a plurality of images of road portions may be labeled as to the type of constructive crosswalk they contain, or if they contain no constructive crosswalk. These labeled images may then be used as training data to train the neural network to predict the likelihood that an image of a road portion contains each type of constructive crosswalk (e.g., using softmax classification).

Figure 4:
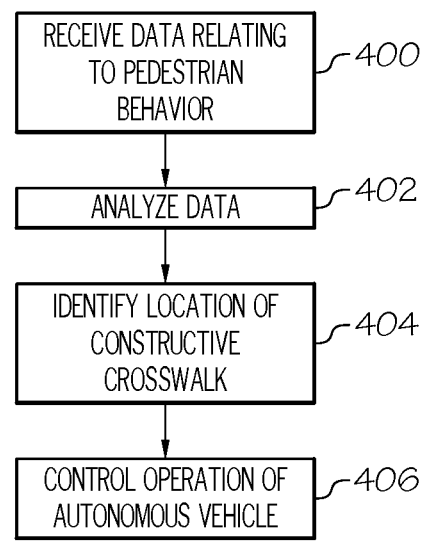
FIG. 4 depicts a flowchart of an example method for modeling pedestrian activity, according to one or more embodiments shown and described herein.

FIG. 4 depicts a flowchart of an example method for modeling pedestrian activity, according to one or more embodiments shown and described herein. At step 400, the remote computing device 104 receives sensor data from the vehicle 102 or other vehicles and/or sensors relating to pedestrian activity. This sensor data may be stored in the database 310 of the remote computing device 104. At step 402, the pedestrian determination module 312, the threshold determination module 314, and/or the pedestrian profile determination module 316 analyze the received sensor data and/or sensor data stored in the database 310, using the techniques described above. At step 404, the constructive crosswalk identification module 318 identifies a location of a constructive crosswalk. Then, at step 406, the vehicle system 200 controls the operation of the vehicle 102 based on the location of the constructive crosswalk.

Figure 5:
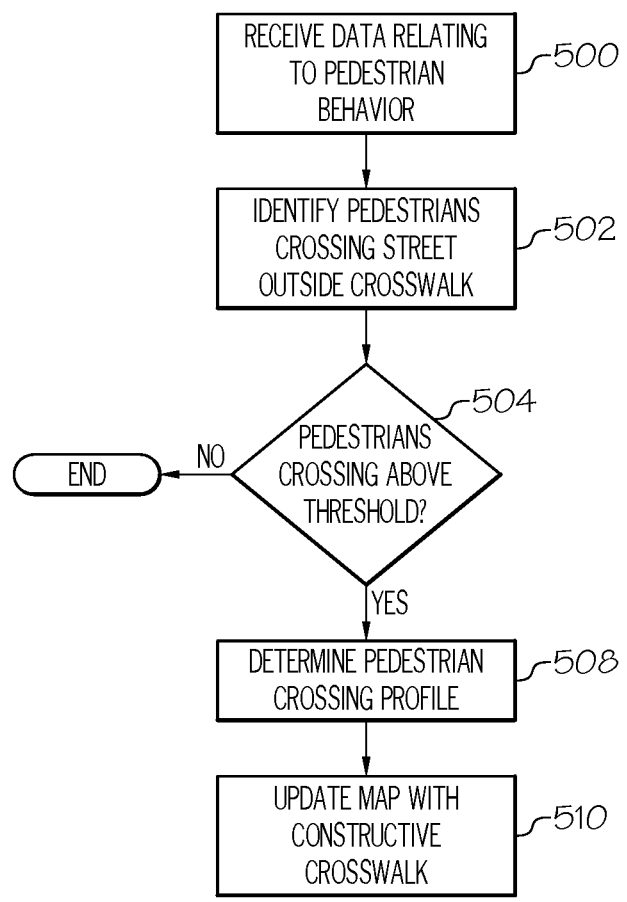
FIG. 5 depicts another flowchart of another example for modeling pedestrian activity, according to one or more embodiments shown and described herein.

FIG. 5 depicts another flowchart of an example method for modeling pedestrian activity, according to one or more embodiments shown and described herein. At step 500, the remote computing device 104 receives sensor data from the vehicle 102 or other vehicles and/or sensors relating to pedestrian activity. This sensor data may be stored in the database 310 of the remote computing device 104. At step 502, the pedestrian determination module 312 identifies pedestrians crossing a street outside of a crosswalk based on data received from the vehicle 102 and/or data stored in the database 310.

At step 504, the threshold determination module 314 determines whether a number pedestrians greater than a predetermined threshold have crossed a street at a location outside of a crosswalk within a predetermined time period. If the threshold determination module 314 determines that a number of pedestrians greater than the predetermined threshold have not crossed a street at a location outside of a crosswalk within the predetermined time period (No at step 504), then the process of FIG. 5 ends. If the threshold determination module 314 determines that a number of pedestrians greater than the predetermined threshold have crossed a street at a location outside of a crosswalk within the predetermined time period (Yes at step 504), then control passes to step 508.

At step 508, the pedestrian profile determination module 316 determines a pedestrian profile for the location where a number of pedestrians greater than the predetermined threshold have crossed a street outside of a crosswalk within the predetermined time period based on the received data and/or data stored in the database 310. At step 510, the constructive crosswalk identification module 318 identifies a constructive crosswalk at the location where a number of pedestrians greater than the predetermined threshold have cross a street outside of a crosswalk within the predetermined time period. The constructive crosswalk identification module 318 then updates a map of the location in the database 310 to indicate the location of the identified constructive crosswalk and an associated pedestrian profile.

Figure 6:
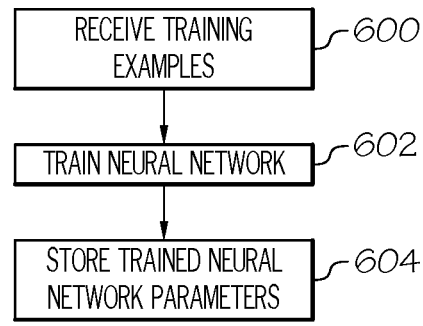
FIG. 6 depicts a flowchart of an example method for training a neural network to estimate a likelihood of a constructive crosswalk for an unknown road portion, according to one or more embodiments shown and described herein.

FIG. 6 depicts a flowchart of an example method for training a neural network to estimate a likelihood of a constructive crosswalk for an unknown road portion, according to one or more embodiments shown and described herein. At step 600, the machine learning module 320 receives training data comprising a plurality of labeled training examples. Each training example comprises an image of a road portion and a label indicating whether the road portion contains a constructive crosswalk. The machine learning module 320 may retrieve the training data from the database 310. In some examples, the training examples may be labeled automatically by the constructive crosswalk identification module 318 or other components of the remote computing device 104. In other examples, the training examples may be labeled manually by one or more human observers.

At step 602, the training data is used to train a neural network. The neural network may comprise any neural network architecture (e.g., a convolutional neural network or other neural network have any number of hidden layers of any size and type). The input layer to the neural network may be an image (e.g., an image of a road portion comprising a training example). The output layer of the neural network may comprise a predicted likelihood that the road portion in the input image contains a constructive crosswalk. A loss function may be defined based on a difference between the predicted likelihood that the road portion contains a constructive crosswalk and the ground truth label (e.g., 1 if the image contains a constructive crosswalk, 0 if the image does not contain a constructive crosswalk). The neural network may then be trained using gradient descent or any other optimization algorithm to minimize a cost function (e.g., an average of the loss functions over all the training examples). At step 604, after the neural network is trained, the learned parameters may be stored in the database 310.

Figure 7:
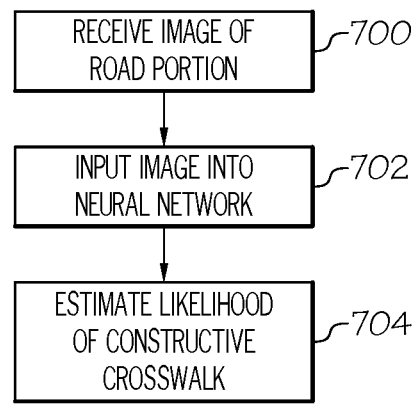
FIG. 7 depicts a flowchart of an example method for estimating a likelihood of a constructive crosswalk for an unknown road portion, according to one or more embodiments shown and described herein.

FIG. 7 depicts a flowchart of an example method for estimating a likelihood of a constructive crosswalk for an unknown road portion, according to one or more embodiments shown and described herein. At step 700, the constructive crosswalk prediction module 322 of the remote computing device 104 receives an image of a road portion. This image may be an image captured by the vehicle sensors 210 of the vehicle 102.

At step 702, the constructive crosswalk prediction module 322 inputs the received input into a neural network that predicts whether a road portion in an image contains a constructive crosswalk. The neural network may have previously been trained by the machine learning module 320. Then, at step 704, the neural network outputs a predicted likelihood that a road portion in the input image contains a constructive crosswalk. The remote computing device 104 may then transmit this prediction to the vehicle 102.

Figure 8:
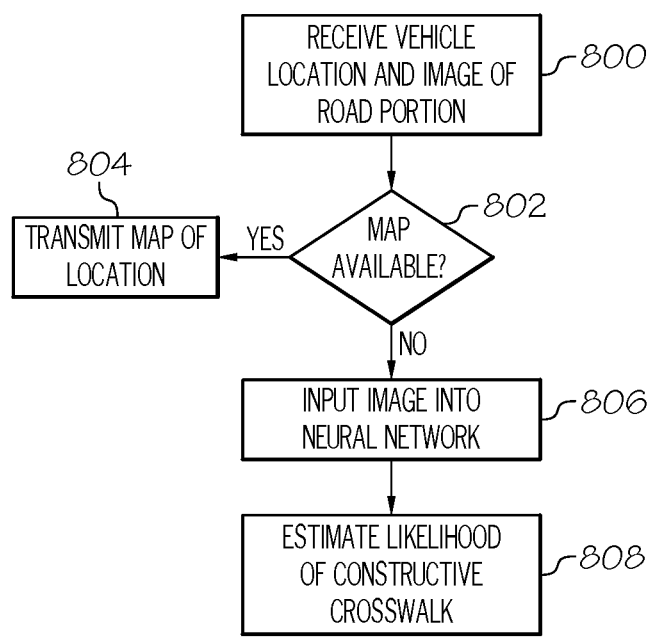
FIG. 8 depicts a flowchart of an example method for determining whether a constructive crosswalk exists for a road portion, according to one or more embodiments shown and described herein.

FIG. 8 depicts another flowchart of an example method for determining whether a constructive crosswalk exists for a road portion, according to one or more embodiments shown and described herein. At step 800, the remote computing device 104 receives an image of a road portion and a location from the vehicle 102. The image may be of an upcoming road portion along a road upon which the vehicle 102 is driving (e.g., an image of the road 106 or the intersection 108 in the example of FIG. 1).

At step 802, the remote computing device 104 determines whether a map of the location of the vehicle 102 is available in the database 310. If a map of the location is available in the database 310 (Yes at step 802), then at step 804, a map of the location is transmitted to the vehicle 102. If a map of the location is not available in the database 310 (No at step 802), then control passes to step 806.

At step 806, the image received from the constructive crosswalk prediction module 322 inputs the image received from the vehicle 102 into a neural network that has been trained by the machine learning module 320. Then, at step 808, the neural network outputs a predicted likelihood that the road portion in the image contains a constructive crosswalk. The remote computing device 104 may transmit this likelihood to the vehicle 102.

It should now be understood that embodiments described herein are directed to systems and methods for modeling pedestrian activity. Pedestrian activity at various locations may be monitored. If pedestrians often cross a street at a particular location outside of a crosswalk, the location may be identified as a constructive crosswalk. A map may then be created or updated to include the location of the constructive crosswalk. Autonomous vehicles may then use this map to locate locations of constructive crosswalks and adjust their driving behavior accordingly.

In embodiments, a neural network may be trained to predict a likelihood of a road portion containing a constructive crosswalk based on an image of the road portion. The neural network may be trained with training examples comprising images of road portion with each image labeled as to whether it contains a constructive crosswalk. After the neural network is trained, an image of a previously unseen road portion may be input into the neural network to predict a likelihood that the road portion contains a constructive crosswalk.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving images of a plurality of road portions;
receiving data relating to pedestrian activity at each of the road portions;
for each of the road portions, determining whether a number of pedestrians that cross a street within the road portion outside of a crosswalk during a predetermined period of time is greater than a predetermined threshold;
labeling each image of a road portion for which the number of pedestrians that cross the street during the predetermined period of time exceeds the predetermined threshold as containing a constructive crosswalk;
labeling each image of a road portion for which the number of pedestrians that cross the street during the predetermined period of time does not exceed the predetermined threshold as not containing a constructive crosswalk;

using the labeled images to train a neural network to receive an input of a road portion and determine a likelihood that the road portion contains a constructive crosswalk where pedestrians are likely to cross a street within the road portion outside of a crosswalk;

capturing an image of a sample road portion with one or more vehicle sensors of an autonomous vehicle;

inputting the image into the trained neural network;

determining a likelihood that one or more locations of the road portion comprise a constructive crosswalk based at least in part on an output of the trained neural network; and controlling operation of the autonomous vehicle based on the determined likelihood that the one or more locations of the road portion comprise a constructive crosswalk.

2. The method of claim 1, further comprising determining a pedestrian profile associated with each of the road portions labeled as a constructive crosswalk, the pedestrian profile comprising a most probable path for pedestrians to cross the street at the location of the constructive crosswalk.

3. The method of claim 1, further comprising determining a pedestrian profile associated with each of the road portions labeled as a constructive crosswalk, the pedestrian profile comprising an average velocity at which pedestrians cross the street at the location of the constructive crosswalk.

4. The method of claim 1, further comprising determining a pedestrian profile associated with each of the road portions labeled as a constructive crosswalk, the pedestrian profile comprising an average density at which pedestrians cross the street at the location of the constructive crosswalk.

5. The method of claim 1, further comprising determining a pedestrian profile associated with each of the road portions labeled as a constructive crosswalk, the pedestrian profile comprising a likelihood of pedestrians ceding a right of way to vehicles when crossing the street at the location of the constructive crosswalk.

6. A computing device comprising:
one or more processors;
one or more memory modules; and
machine readable instructions stored in the one or more memory modules that, when executed by the one or more processors, cause the computing device to:
receive data relating to pedestrian activity at each of the road portions;
for each of the road portions, determine whether a number of pedestrians that cross a street within the road portion outside of a crosswalk during a predetermined period of time is greater than a predetermined threshold;
label each image of a road portion for which the number of pedestrians that cross the street during the predetermined period of time exceeds the predetermined threshold as containing a constructive crosswalk;
label each image of a road portion for which the number of pedestrians that cross the street during the predetermined period of time does not exceed the predetermined threshold as not containing a constructive crosswalk;
use the labeled images to train a neural network to receive an input of a road portion and determine a likelihood that the road portion contains a constructive crosswalk where pedestrians are likely to cross a street within the road portion outside of a crosswalk;
capturing an image of a sample road portion with one or more vehicle sensors of an autonomous vehicle;
input the image into the trained neural network;
determine a likelihood that one or more locations of the road portion comprise a constructive crosswalk based at least in part on an output of the trained neural network; and
control operation of the autonomous vehicle based on the determined likelihood that the one or more locations of the road portion comprise a constructive crosswalk.

7. The computing device of claim 6, wherein the one or more processors further cause the computing device to determine a pedestrian profile associated with each of the road portions labeled as a constructive crosswalk, the pedestrian profile comprising a most probable path for pedestrians to cross the street at the location of the constructive crosswalk.

8. The computing device of claim 6, wherein the one or more processors further cause the computing device to determine a pedestrian profile associated with each of the road portions labeled as a constructive crosswalk, the pedestrian profile comprising an average velocity at which pedestrians cross the street at the location of the constructive crosswalk.

9. The computing device of claim 6, wherein the one or more processors further cause the computing device to determine a pedestrian profile associated with each of the road portions labeled as a constructive crosswalk, the pedestrian profile comprising an average density at which pedestrians cross the street at the location of the constructive crosswalk.

10. The computing device of claim 6, wherein the one or more processors further cause the computing device to determine a pedestrian profile associated with each of the road portions labeled as a constructive crosswalk, the pedestrian profile comprising a likelihood of pedestrians ceding a right of way to vehicles when crossing the street at the location of the constructive crosswalk.

* * * * *